United States Patent
Stelmar Netto et al.

(10) Patent No.: US 11,941,798 B2
(45) Date of Patent: Mar. 26, 2024

(54) FOOD-PRODUCT TRACKING BY PHOTOGRAMMETRY

(71) Applicant: International Business Machines Corporation, Armonk, NY (US)

(72) Inventors: Marco Aurelio Stelmar Netto, Sao Paulo (BR); Vagner Figueredo de Santana, São Paulo (BR); Ricardo Luis Ohta, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 17/010,882

(22) Filed: Sep. 3, 2020

(65) Prior Publication Data

US 2022/0067897 A1    Mar. 3, 2022

(51) Int. Cl.
| | | |
|---|---|---|
| *G06T 7/00* | (2017.01) | |
| *G06Q 30/018* | (2023.01) | |
| *G06T 7/13* | (2017.01) | |
| *G06T 7/70* | (2017.01) | |

(52) U.S. Cl.
CPC .......... *G06T 7/001* (2013.01); *G06Q 30/018* (2013.01); *G06T 7/13* (2017.01); *G06T 7/70* (2017.01); *G06T 2207/30128* (2013.01)

(58) Field of Classification Search
CPC .. G06T 7/62; G06T 7/001; G06T 7/13; G06T 7/70; G06T 2207/10012; G06T 2207/30128; G06Q 30/018
See application file for complete search history.

(56) References Cited

U.S. PATENT DOCUMENTS

| | | |
|---|---|---|
| 6,270,724 B1 | 8/2001 | Woodaman |
| 6,982,640 B2 | 1/2006 | Lindsay et al. |
| 9,080,997 B2 | 7/2015 | Minvielle |
| 2006/0061454 A1 | 3/2006 | Debord et al. |

(Continued)

FOREIGN PATENT DOCUMENTS

| | | |
|---|---|---|
| AU | 2009210394 B2 | 9/2009 |
| CA | 2587033 A1 | 3/2006 |

(Continued)

OTHER PUBLICATIONS

Mcfarlane, N. J. B., et al. "Shape measurements of live pigs using 3-D image capture." Animal Science 81.3 (2005). (Year: 2005).*

(Continued)

*Primary Examiner* — Vu Le
*Assistant Examiner* — Tracy Mangialaschi
(74) *Attorney, Agent, or Firm* — Eric W. Chesley

(57) ABSTRACT

A method can include determining by photogrammetry, a first volume of a food-product unit and a second volume of a food-product subunit. The food-product subunit can be a separated portion of the food-product unit. The method can further include generating a code for the food-product subunit. The code can include a first identifier for the food-product unit and a second identifier for the food-product subunit. The first identifier can be based, at least in part, on the first volume. The second identifier can be based, at least in part, on the second volume. The method can further include assigning the code to the food-product subunit.

17 Claims, 6 Drawing Sheets

(56) References Cited

U.S. PATENT DOCUMENTS

| | | | |
|---|---|---|---|
| 2007/0178818 A1* | 8/2007 | Schimitzek | A22B 5/007 452/157 |
| 2008/0144880 A1* | 6/2008 | DeLuca | G06T 7/20 382/100 |
| 2012/0109789 A1 | 5/2012 | Bhatt et al. | |
| 2015/0241412 A1 | 8/2015 | Hakovirta et al. | |
| 2016/0034907 A1 | 2/2016 | Worrall et al. | |
| 2016/0148440 A1 | 5/2016 | Kwak | |
| 2017/0038373 A1 | 2/2017 | Zourob | |
| 2017/0262973 A1 | 9/2017 | Johnston | |
| 2019/0049172 A1 | 7/2019 | Beasley et al. | |
| 2019/0213537 A1 | 7/2019 | Mehring et al. | |

FOREIGN PATENT DOCUMENTS

| | | | | |
|---|---|---|---|---|
| CN | 109856196 A | | 6/2019 | |
| CN | 111353788 A | * | 6/2020 | G06K 17/0029 |
| JP | 2007513802 A | | 5/2007 | |
| JP | 2012181192 A | | 9/2012 | |
| WO | 2013188356 A1 | | 12/2013 | |
| WO | 2016087084 A1 | | 6/2016 | |
| WO | 2017087983 A1 | | 5/2017 | |
| WO | 2017101140 A1 | | 6/2017 | |
| WO | WO-2017181214 A1 | * | 10/2017 | |

OTHER PUBLICATIONS

Gopalakrishnan, PK, and Behdad, S. "A Conceptual Framework for using videogrammetry in Blockchain platforms for food supply chain traceability." International Design Engineering Technical Conferences and Computers and Information in Engineering Conference. vol. 59223. ASME, 2019. (Year: 2019).*

Foster, Tristan Parker. A comparison of beef traceability models during serial and parallel processing methods. Michigan State University, 2016. (Year: 2016).*

Unknown, "RFID for Food Tracing in Meat Processing Plants", printed May 6, 2020 7 pages.

Barandun et al., "Cellulose Fibers Enable Near-Zero-Cost Electrical Sensing of Water-Soluble Gases", ACS Sens. 4, pp. 1662-1669, 2019.

Brondum, J., "New Sensors and Techniques for Meat Quality Measurements", Reciprocal Meat Conference Proceedings, vol. 51, 1998, pp. 13-18.

Chen et al., "Freshness Evaluation of Three Kinds of Meats Based on the Electronic Nose", Sensors , 19, 605, 11 pages, 2019.

Fletcher et al., "Advances in meat spoilage detection: A short focus on rapid methods and technologies", CyTA—Journal of Food, 16:1, pp. 1037-1044, 2018.

Unknown, "FOODsniffer", printed on May 5, 2020, 6 pages.

Fraunhofer-Gesellschaft, "Rotten meat doesn't stand a chance", Apr. 1, 2011, 3 pages.

Li et al., "Flexible Ammonia Sensor Based on PEDOT:PSS/Silver Nanowire Composite Film for Meat Freshness Monitoring", IEEE Electron Device Letters, vol. 38, No. 7, pp. 975-978, Jul. 2017.

Liu et al., "Single-Walled Carbon Nanotube/Metalloporphyrin Composites for the Chemiresistive Detection of Amines and Meat Spoilage", Angewandte Chem. Int. Ed., 54, 5 pages, 2015.

Muller et al., "Intelligent Packaging in the Food Sector: A Brief Overview", Foods, 13 pages, 2019.

Nguyen et al., "Development of novel wireless sensor for food quality detection" Adv. Nat. Sci.: Nanosci. Nanotechnol. 6, 2015, 12 pages.

Salinas et al., "Monitoring of chicken meat freshness by means of a colorimetric sensor array", Dynamic Article Links, pp. 3635-3643, 2012.

Shukla et al, "Development of on package indicator sensor for real-time monitoring of meat quality", Veterinary World, Research Article, pp. 393-397, 2015.

Wijaya et al., "Development of mobile electronic nose for beef quality monitoring", Procedia Computer Science 124, pp. 728-735, 2017.

Zhang et al., "Electronic Nose with an Air Sensor Matrix for Detecting Beef Freshness", Journal of Bionic Engineering 5, pp. 67-73, 2008.

Mell et al., "The NIST Definition of Cloud Computing", Recommendations of the National Institute of Standards and Technology, Sep. 2011, 7 pages.

Unknown, "Basics of Photogrammetry", Geodetic Systems, printed Sep. 2, 2020, 46 pages.

* cited by examiner

FOOD-PRODUCT TRACKING BY PHOTOGRAMMETRY

BACKGROUND

The present disclosure relates to food processing, and more specifically, to food-product tracking.

Entities involved in food processing operations can have a vested interest in ensuring that the food products provided to consumers are safe. Processing perishable food products, such as meat, can include multiple stages of handling and transportation, each of which can be subject to various safety requirements. For example, food-processing facilities where meat is processed (e.g., cut, ground, packaged, etc.) can be subject to requirements for preservation, storage, sanitization, labeling (e.g., expiration date, meat producer/breeder source, etc.), and the like. In addition to helping ensure safety, such requirements can ensure compliance with certification standards, such as a Kosher certification or a grass-fed certification. Accordingly, for safety and compliance purposes, entities may implement various technologies to monitor food-processing operations.

Such monitoring can include challenges. For example, in some instances, recording data about food processing operations (e.g., information about a source, physical characteristics, and/or storage conditions of a meat product) can be subject to human error and/or tampering. For example, in some instances, an operator can incorrectly record storage parameters of a food product. In some instances, a wrongful actor can manipulate data such that a food product can be falsely presented. For example, such a wrongful actor can modify food product data such that a non-grass-fed meat product can appear to have satisfied grass-fed certification standards. Accordingly, data accuracy and integrity concerns can coincide with monitoring food processing operations.

SUMMARY

Aspects of the present disclosure are directed toward a method comprising determining by photogrammetry, a first volume of a food-product unit and a second volume of a food-product subunit. The food-product subunit can be a separated portion of the food-product unit. The method can further include generating a code for the food-product subunit. The code can include a first identifier for the food-product unit and a second identifier for the food-product subunit. The first identifier can be based, at least in part, on the first volume. The second identifier can be based, at least in part, on the second volume. The method can further include assigning the code to the food-product subunit.

Advantageously, the aforementioned aspects of the present disclosure improve data accuracy by employing photogrammetry to allow autonomous monitoring of food processing operations. Furthermore, aspects of the present disclosure improve traceability between a food-product unit and a food-product subunit by generating a code that includes a first identifier for the food-product unit and a second identifier for the food-product subunit, and assigning the code to the food-product subunit. Furthermore, by generating a code, aspects of the present disclosure improve data integrity, as the code can reduce an ability to manipulate and/or tamper with data used to track food products.

Further embodiments of the present disclosure including the aspects discussed in the aforementioned method further comprise the determining by photogrammetry comprising obtaining a set of images of the food-product unit. The determining by photogrammetry further comprising identifying, based on the set of images, one or more first borders of the food-product unit. The determining by photogrammetry further comprising calculating, based at least in part on the one or more first borders, the first volume of the food-product unit.

Advantageously, the aforementioned embodiments enable autonomous, accurate determination of a characteristic (i.e., volume) usable to track and verify the food-product unit.

Further embodiments of the present disclosure including the aspects discussed in the aforementioned method further comprise the determining by photogrammetry comprising obtaining a set of images of the food-product subunit. The determining by photogrammetry further comprising identifying, based on the set of images, one or more second borders of the food-product subunit. The determining by photogrammetry further comprising calculating, based at least in part on the one or more second borders, the second volume of the food-product subunit.

Advantageously, the aforementioned embodiments enable autonomous, accurate determination of a characteristic (i.e., volume) usable to track and verify the food-product subunit.

Further embodiments of the present disclosure including the aspects discussed in the aforementioned method further comprise the determining by photogrammetry comprising obtaining a set of images of the food-product unit. The determining by photogrammetry further comprising identifying, based on the set of images, one or more first borders of the food-product unit. The one or more first borders can include two or more points. The determining by photogrammetry further comprising identifying, based on a changed distance between the two or more points, the food-product subunit.

Advantageously, the aforementioned embodiments enable autonomous, accurate determination of a separation of a food-product subunit from a food-product unit. Such determination can facilitate tracking and verifying the food-product unit and the food-product subunit.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
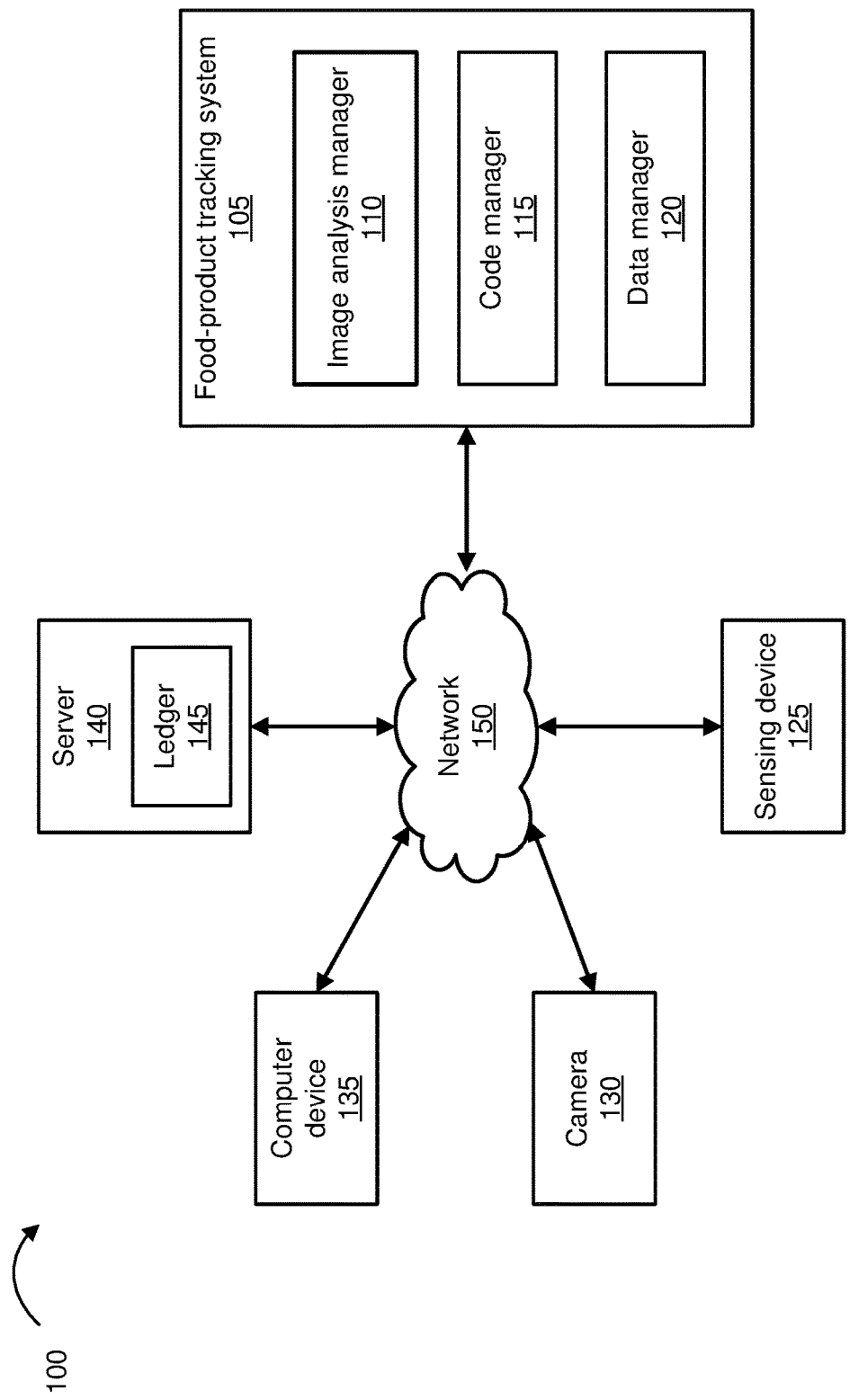
FIG. 1 depicts an example computing environment having a food-product tracking system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to food processing; more particular aspects relate to food-product tracking by photogrammetry. While the present disclosure is not necessarily limited to such applications, various aspects of the disclosure may be appreciated through a discussion of various examples using this context.

Entities involved in food processing operations can have a vested interest in ensuring that the food products provided to consumers are safe. Processing perishable food products, such as meat, can include multiple stages of handling and transportation, each of which can be subject to various safety requirements. For example, food-processing facilities where meat is processed (e.g., cut, ground, packaged, etc.) can be subject to requirements for preservation, storage, sanitization, labeling (e.g., expiration date, meat producer/breeder source, etc.), and the like. In addition to helping ensure safety, such requirements can ensure compliance with certification standards, such as a Kosher certification or a grass-fed certification. Accordingly, for safety and compliance purposes, entities may implement various technologies to monitor food-processing operations.

Such monitoring can include challenges. For example, in some instances, recording data about food processing operations (e.g., information about a source, physical characteristics, and/or storage conditions of a meat product) can be subject to human error and/or tampering. For example, in some instances, an operator can incorrectly record storage parameters of a food product. In some instances, a wrongful actor can manipulate data such that a food product can be falsely presented. For example, such a wrongful actor can modify a food product's source data such that a non-grass-fed meat product can appear to have satisfied grass-fed certification standards. Accordingly, data accuracy and integrity concerns can coincide with monitoring food processing operations.

To address these and other challenges, embodiments of the present disclosure include a food-product tracking system. In some embodiments, the food-product tracking system can employ photogrammetry and code generation to monitor food-processing operations. Photogrammetry can refer to a method of generating three-dimensional measurements of an object based on a set of two-dimensional images of the object. Thus, in some embodiments of the present disclosure, the food-product tracking system can calculate a volume of a food-product unit based on a set of images of the food-product unit. In some embodiments, the food-product system can identify one or more food-product subunits that are separated (e.g., cut from) a food-product unit and calculate a volume of the one or more food-product subunits. The food-product tracking system can further generate a code, such as a hash value, that can include information such as a volume of a food-product subunit, a volume of a food-product unit from which the food-product subunit was separated, and other characteristic data corresponding to the food-product unit and/or subunit. In some embodiments, the code and its corresponding information (e.g., volume/characteristic data) can be transmitted to an electronic ledger that can be accessed through a network. Such access can allow a user, such as a food-product purchaser, to retrieve information about food-processing operations corresponding to the food-product (e.g., a handling time, location, temperature, and/or identification of a food-product unit from which a food-product subunit was separated). In some embodiments, the food-product tracking system can be used with low-cost sensors configured to indicate a condition (e.g., temperature, spoilage, etc.) of a packaged food-product. Since embodiments of the present disclosure can autonomously monitor food-processing operations based on captured images, embodiments of the present disclosure can monitor food-processing operations in a manner that can improve data accuracy and integrity. As a result, embodiments of the present disclosure can facilitate the delivery of safe, authentic food-products to consumers.

Turning to the figures, FIG. 1 illustrates a computing environment 100 that includes one or more of each of a food-product tracking system 105, a sensing device 125, a camera 130, a computer device 135, a server 140, and/or a network 150. In some embodiments, at least one food-product tracking system 105, sensing device 125, camera 130, computer device 135, and/or server 140 can exchange data with at least one other through the at least one network 150. For example, in some embodiments, at least one food-product tracking system 105 can exchange data with at least one camera 130 through the at least one network 150. One or more of each of the food-product tracking system 105, sensing device 125, camera 130, computer device 135, server 140, and/or network 150 can include a computer system, such as the computer system 401 discussed with respect to FIG. 4.

In some embodiments, the food-product tracking system 105 can be included in software installed on a computer system of at least one of the computer device 135, server 140, and/or camera 130. In an example, in some embodiments, the food-product tracking system 105 can be included as a plug-in software component of software installed on the computer device 135. The food-product tracking system 105 can include program instructions implemented by a processor, such as a processor of the computer device 135, to perform one or more operations discussed with respect to FIGS. 2A, 2B, and 3.

In some embodiments, the food-product tracking system 105 can include one or more modules, such as an image analysis manager 110, a code manager 115, and/or a data manager 120. In some embodiments, the image analysis manager 110, code manager 115, and/or data manager 120 can be integrated into a single module. In some embodiments, the image analysis manager 110 can be configured to obtain one or more images from the at least one camera 130 through a network 150. The image analysis manager 110 can further be configured to interpret and analyze the one or more images. For example, in some embodiments, the image analysis manager 110 can employ photogrammetry software configured to calculate volumes of one or more items included in the one or more images. In some embodiments, the image analysis manager 110 can employ image analysis software configured to identify features and/or characteristics (e.g., colors, textures, shapes, borders, surfaces, coordinates, and/or dimensions) of one or more items included in the one or more images.

In some embodiments, the code manager 115 can be configured to generate codes (e.g., sets of alphanumeric characters) corresponding to one or more items included in the one or more images. For example, in some embodiments, the code manager 115 can include one or more hash functions configured to generate one or more hash values corresponding to items included in an image. For example, as discussed in more detail below, in some embodiments, the code manager 115 can generate a hash value corresponding to a food-product unit (e.g., a primal cut of beef) and/or a hash value corresponding to a food-product subunit (e.g., a subprimal cut of beef removed from the primal cut of beef). In some embodiments, the code manager 115 can be configured to generate codes that include data obtained from the image analysis manager 110 and the data manager 120. For example, in some embodiments, the code manager 115 can generate a hash corresponding to a food-product subunit; the hash can include a component that represents a volume of the food-product subunit obtained from the image analysis manager 110 and a component that represents a weight of the food-product subunit obtained from the data manager 120.

In some embodiments, the data manager 120 can be configured to obtain data from the at least one sensing device 125. In some embodiments, such data can include a time, location, and/or temperature corresponding to a food-processing operation. In some embodiments, the data manager 120 can be configured to transmit data, such as codes, from the food-product tracking system 105 to a computer device 135 and/or a server 140.

Figure 2A:
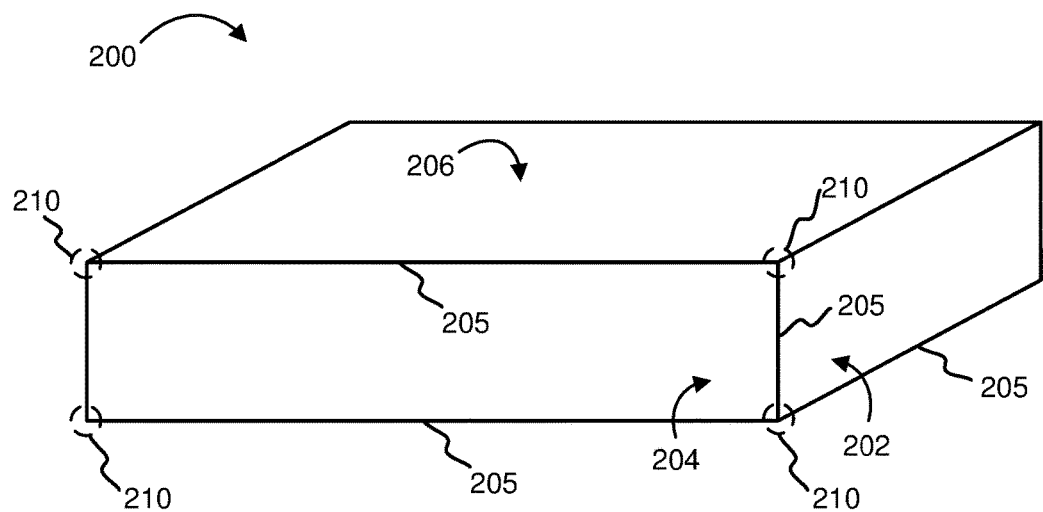
FIG. 2A depicts an example food-product unit, in accordance with embodiments of the present disclosure.
Figure 2B:
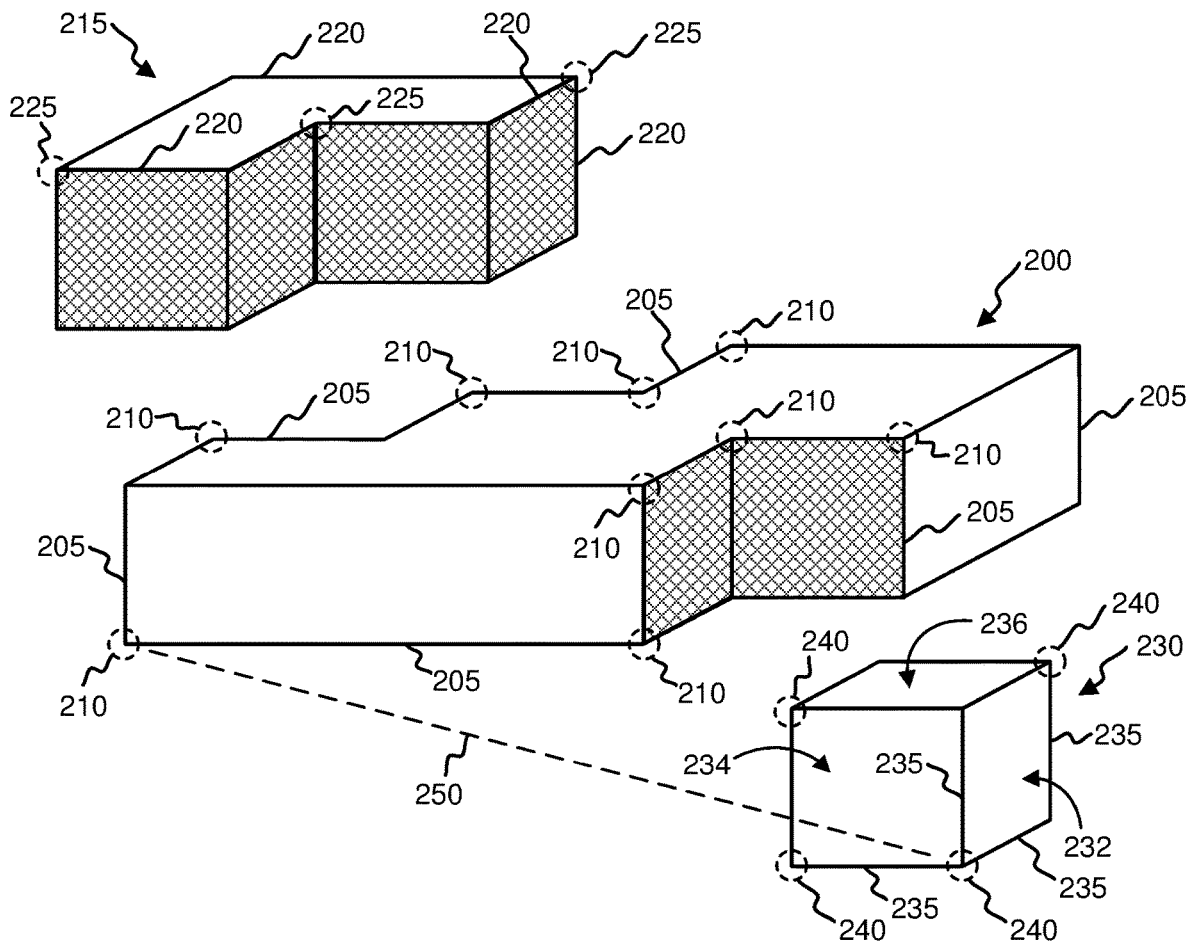
FIG. 2B depicts the example food-product unit of FIG. 2A, from which food-product subunits have been removed, in accordance with embodiments of the present disclosure.
Figure 3:
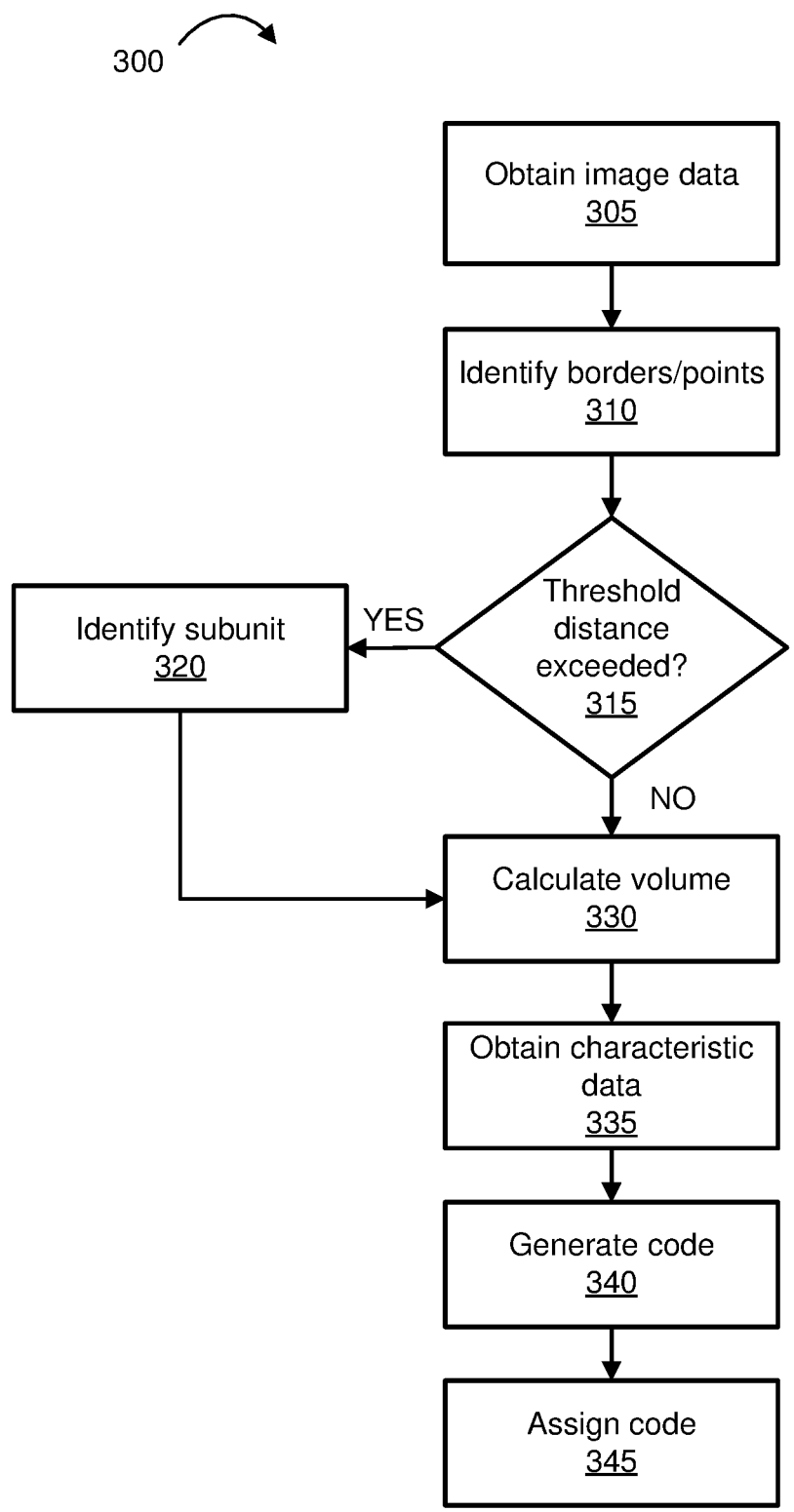
FIG. 3 depicts a flowchart of an example method for food-product tracking by photogrammetry, in accordance with embodiments of the present disclosure.

In some embodiments, one or more of the image analysis manager 110, code manager 115, and/or data manager 120 can include program instructions implemented by a processor, such as a processor of the computer device 135, to perform one or more operations discussed with respect to FIGS. 2A, 2B, and 3. For example, in some embodiments, the image analysis manager 110 can include program instructions to perform operations 305-335, FIG. 3. In some embodiments, the code manager 115 can include program instructions to perform operation 340, FIG. 3. In some embodiments, the data manager 120 can include program instructions to perform operations 335 and/or 345, FIG. 3.

In some embodiments, the at least one sensing device 125 can include one or more devices such as a scale, temperature sensor, and/or a location device (e.g., a global positioning system device). In some embodiments, the at least one sensing device 125 can transmit data corresponding to a food-processing operation to the food-product tracking system 105. For example, in some embodiments, during a cutting process of meat at a food-processing facility, a scale at the facility can obtain a weight of a cut of meat and transmit the weight to the food-product tracking system 105. In another example, a temperature sensor at the facility can obtain a temperature of the cut of meat and transmit the temperature to the food-product tracking system 105. In another example, a location device at the facility can transmit the location of the cut of meat to the food-product tracking system 105.

In some embodiments, the at least one camera 130 can be configured to capture (e.g., obtain and store) one or more images. In some embodiments, the at least one camera 130 can be further configured to capture images from a plurality of orientations (e.g., distances and/or angles) relative to a food product. For example, in some embodiments, a food-processing facility can include four cameras positioned at unique distances and/or angles relative to a surface where a food product is cut. The at least one camera 130 can be configured to transmit one or more images to the food-product tracking system 105.

In some embodiments, the at least one computer device 135 can include a device such as a notebook, tablet, mobile phone, and/or desktop computer. In some embodiments, the computer device 135 can include an output device (not shown), such as a printer configured to print a label (e.g., a barcode label) corresponding to a code generated by the food-product tracking system 105.

In some embodiments, the at least one server 140 can be a web server that can store data such as codes generated by the food-product tracking system 105 and characteristic data corresponding to food-product units and/or subunits. In some embodiments, such data can be stored in an electronic ledger 145 that can be accessed through the network 150. In some embodiments, the electronic ledger 145 can be a distributed ledger that stores data in key-value pairs. For example, the electronic ledger 145 can store a code generated by the food-product tracking system as a key and store characteristic data associated with the code as a value. Thus, in some embodiments, the code generated by the food-product tracking system 105 can function as a blockchain. In this configuration, a user, such as a purchaser of a food-product unit and/or food-product subunit can obtain authentic data regarding the processing of the food-product unit and/or subunit from the at least one server 140.

In some embodiments, the at least one network 150 can be a wide area network (WAN), a local area network (LAN), the internet, or an intranet. In some embodiments, the network 150 can be substantially similar to, or the same as, cloud computing environment 50 discussed with respect to FIG. 5.

FIGS. 2A and 2B respectively illustrate a food-product unit 200 before food-product subunits 215, 230 are removed and the food-product unit 200 after food-product subunits 215, 230 are removed. A food-product unit can refer to a food item from which portions (i.e., food-product subunits) can be removed. For example, in some embodiments, the food-product unit 200 can be a quantity of meat, such as a primal cut of beef, pork, and/or lamb, from which smaller, subprimal cuts (e.g., food-product subunits 215, 230) are separated during a food-processing operation. For clarity, FIGS. 2A and 2B illustrate the food-product unit 200 and the food-product subunits 215, 230 having square and rectangular shapes; however, the food-product unit 200 and the food-product subunits 215, 230 can include a variety of arbitrary geometries. The food-product tracking system 105 can perform operations discussed with respect to FIG. 3 based on the food-product unit 200 and the food-product subunits 215, 230, as discussed below.

Regarding FIGS. 2A and 2B, the food-product tracking system can identify features of the food-product unit 200 and/or subunit 215, 230, such as borders/edges 205, 220, 235 and points/vertices 210, 225, 240 (for clarity, only a subset of borders and points are labeled in FIGS. 2A and 2B). In some embodiments, a border 205, 220, 235 can include a perimeter or outer boundary of a food-product unit 200 or a food-product subunit 215, 230. In some embodiments, a border 205, 220, 235 can include a region where two surfaces/faces (e.g., surface 202 and surface 204, surface 232 and surface 234) intersect. In some embodiments, a border can include one or more points 210, 225, 240. In some embodiments, a point 210, 225, 240 can include a region where two or more surfaces intersect (e.g., intersection of surfaces 202, 204, and 206; intersection of surfaces 232, 234, and 236). In some embodiments, a point 210, 225, 240 can represent an extremity of a food-product unit 200 and/or subunit 215, 230. As discussed below, the food-product tracking system can calculate a volume of the food-product unit 200 and/or subunit 215, 230 based, at least in part, on identified features, such as borders 205, 220, 235 and points 210, 225, 240.

Regarding FIG. 2B, the food-product tracking system can determine when a first food-product subunit 230 and/or a second food-product subunit 215 is separated from the food-product unit 200. For example, in some embodiments, the food-product tracking system can determine when a distance 250 between borders (e.g., border 205 and border 235) and/or a distance 250 between points (e.g., point 210 and point 240) increases and/or exceeds a threshold. In these embodiments, such an increase and/or exceeding of a threshold can indicate to the food-product tracking system that a food-product subunit 215, 230 has been separated from the food-product unit 200.

FIG. 3 illustrates a flowchart of an example method 300 for food-product tracking by photogrammetry, in accordance with embodiments of the present disclosure. Method 300 can be performed by a food-product tracking system, such as food-product tracking system 105, FIG. 1.

Referring back to FIG. 3, in operation 305, the food-product tracking system can obtain image data. Image data can include one or more images of a food-product unit and/or subunit. In some embodiments, image data can include characteristic data corresponding to one or more images, such as a time, date, location, and/or orientation from which an image was captured. In some embodiments, operation 305 can include the food-product tracking system receiving one or more images of a food-product unit and/or a food-product subunit from one or more cameras, such as camera 130, FIG. 1. In some embodiments, operation 305 can include the food-product tracking system controlling one or more cameras to capture the one or more images (e.g., the food-product tracking system can transmit a command to one or more cameras to capture one or more images).

In some embodiments, operation 305 can include the food-product tracking system obtaining one or more images, each captured from a different orientation relative to a food-product unit and/or a food-product subunit. In some embodiments, an orientation can include a position (e.g., (X,Y,Z) coordinates) and/or an angle of a camera relative to a food-product unit and/or food-product subunit whose image is captured by the camera. In an example, operation 305 can include the food-product tracking system obtaining a first image of a food-product subunit from a first camera having X, Y, Z coordinates (in meters) (0, 0, 2) and a 60° angle relative to the food-product subunit. Additionally in this example, the food-product tracking system can obtain a second image of the food-product subunit from a second camera having X, Y, Z coordinates (in meters) (1, 1, 2) and a 50° angle relative to the food-product subunit. In some embodiments, operation 305 can include the food-product tracking system obtaining a plurality of images of a food-product unit being separated into one or more food-product subunits during a food-processing operation. For example, in some embodiments, operation 305 can include the food-product tracking system obtaining a plurality of images of a meat-cutting process.

In operation 310, the food-product tracking system can identify one or more borders and/or points of a food-product unit and/or a food-product subunit, based on the image data obtained in operation 305. In some embodiments, operation 310 can include the food-product tracking system employing image analysis technology to identify features and/or characteristics (e.g., colors, textures, surfaces, shapes, coordinates, and/or dimensions) of a food-product unit and/or a food-product subunit included in an image. In some embodiments, operation 310 can include the food-product tracking system identifying a food-product unit by storing an image of the food-product unit and/or electronically labeling an image of a food-product unit. For example, in some embodiments, the food-product tracking system can electronically label an image "FP unit-1" to indicate that a first food-product unit is present in the image.

In operation 315, the food-product tracking system can determine whether a distance between borders and/or points increases such that the distance exceeds a pre-determined threshold. For example, in some embodiments, the food-product tracking system can determine, by mathematical analysis, a first distance between two points of a food-product unit, such points can be identified in operation 310. Further in this example, the first distance can be based on a first image of the food-product unit. Continuing with this example, based on a second, subsequent image of the food-product unit, the food-product tracking system can determine a second distance between the two points of the food-product unit. Based on the first and second distance, the food-product tracking system can determine a percentage change between the first distance and the second distance. Continuing with this example, the food-product tracking system can compare the percentage change with a threshold, such as 10%. (In this example, the threshold can be selected by an entity such as a user or a programmer of the food-product tracking system; the threshold can be stored in a memory of the food-product tracking system). Continuing with this example, the food-product tracking system can determine that the threshold is exceeded if the percentage change is greater than the 10% threshold.

If the food-product tracking system determines in operation 315 that the threshold is exceeded, then the food-product tracking system can proceed to operation 320. Alternatively, if the food-product tracking system determines that the threshold is not exceeded, then the food-product tracking system can proceed to operation 330.

In operation 320, the food-product tracking system can identify one or more food-product subunits. In some embodiments, operation 320 can include the food-product tracking system storing an image of a food-product subunit and/or electronically labeling an image of a food-product subunit. For example, in some embodiments, the food-product tracking system can electronically label an image "sub-1" to indicate that a first food-product subunit is present in the image. In some embodiments, operation 320 can include the food-product tracking system identifying borders and/or points of a food-product subunit in a manner identical or substantially similar to that described with respect to operation 310.

In operation 330, the food-product tracking system can calculate a volume of a food-product unit and/or a food-product subunit. For example, in some embodiments, the food-product tracking system can employ a mathematical analysis to calculate such a volume based on features such as points, borders, coordinates, and/or dimensions obtained in operation 310 and/or operation 320. In some embodiments, the calculated volume can serve as unique characteristic data of a food-product unit and/or a food-product subunit. Thus, in some embodiments, the calculated volume can facilitate tracking and/or verifying the authenticity of a food-product unit and/or a food-product subunit.

In operation 335, the food-product tracking system can obtain characteristic data. In some embodiments, characteristic data can include information such as a weight, color, texture, volume, time, and/or location. In some embodiments, the food-product tracking system can obtain characteristic data from a sensing device, such as sensing device 125, FIG. 1.

In operation 340, the food-product tracking system can generate one or more codes for a food-product unit and/or a food-product subunit. In some embodiments, a code can include one or more identifiers. An identifier can refer to a component of a code that can represent a food-product unit, a food-product subunit, and/or a set of characteristics of a food-product unit or subunit. In some embodiments, operation 340 can include the food-product tracking system employing one or more hash functions to generate one or more codes (e.g., hash values). In some embodiments, the food-product tracking system can employ a cryptographic hash function, such as SHA-256, to generate one or more codes. By utilizing codes, embodiments of the present disclosure can reduce an ability to manipulate data used to track food products; thus, embodiments of the present disclosure can increase the integrity of such data.

In an example, in some embodiments, the food-product tracking system can generate a first code for a food-product unit (e.g., 200, FIG. 2A), a second code for a first food-product subunit that was separated (e.g., cut) from the food-product unit (e.g., 230, FIG. 2B), and a third code for a second food-product subunit that was also separated from the food-product unit (e.g., 215, FIG. 2B). In this example, each code can be a hash value generated by a hash function of the food-product tracking system. Continuing with this example, such a hash function (f) can generate the following: (1) the first code based on information (e.g., image label, dimensions, location, time, weight, volume, color) about the food-product unit; (2) the second code based on information (e.g., image label, dimensions, location, time, weight, volume, color) about the first food-product subunit and the food-product unit; and (3) the third code based on information (e.g., image label, dimensions, location, time, weight, volume, color) about the second food-product subunit and the food-product unit. Additionally, in some embodiments the hash function can generate a supplemental first code (shown below as $f_{first\ code}$) for the food-product unit each time a food-product subunit is separated from it. The supplemental first code can be based on information (e.g., image label, dimensions, location, time, weight, volume, color) about the food-product unit after each food-product subunit is separated from it. Thus, in this example, the first code, second code, and third code, respectively, can be represented as:

$f_{first\ code}$ (image label, dimensions, location, time, weight, volume, color);

$f_{second\ code}$ (image label, dimensions, location, time, weight, volume, color)+$f_{first\ code}$;

$f_{third\ code}$ (image label, dimensions, location, time, weight, volume, color)+$f_{first\ code}$.

Accordingly, the codes for each of the food-product subunits include an identifier for the food-product unit (i.e., the second code and the third code respectively include $f_{first\ code}$ and $f_{first\ code}$). In this way, the food-product tracking system can generate codes that permit each food-product subunit to be traced to the food-product unit from which it was separated. Additionally, the following describes an example of an identifier for a food-product subunit. Using the second code as an example, the component $f_{second\ code}$ (image label, dimensions, location, time, weight, volume, color) includes at least one identifier for the first food-product subunit. The component of the second code that is based on the image label (e.g., an electronic label generated for an image of the first food-product subunit) can be an identifier for the first food-product subunit and/or the component of the second code that is based on one or more of the characteristics (e.g., dimensions, location, time, weight, volume, color) of the first food-product subunit can be an identifier for the first food-product subunit.

In operation 345, the food-product tracking system can assign a code generated in operation 340 to a corresponding food-product unit and/or food-product subunit. In some embodiments, assigning a code can include correlating the code with a food-product unit and/or a food-product subunit. For example, in some embodiments, operation 345 can include the food-product tracking system storing a code such that it is associated with an image of a corresponding food-product unit or subunit (e.g., storing a code as metadata of an image file of a corresponding food-product subunit). In some embodiments, operation 345 can include the food-product tracking system transmitting a code to an electronic ledger (e.g., ledger 145, FIG. 1) that can store the code as a record entry for a corresponding food-product unit or subunit. In some embodiments, the code can serve as a verification that data (e.g., characteristic data) corresponding to a food-product unit or subunit that is stored in the electronic ledger was generated by the food-product tracking system. In some embodiments, operation 345 can include the food-product tracking system transmitting a code to an output device, such as a printer, such that the output device can generate a label that includes the code. Such a label can be affixed to a corresponding food-product unit or subunit (e.g., a packaging label). In some embodiments, such a label can include a barcode/QR Code that can be scanned by a user, such as a purchasing customer, to obtain food-processing information about a food-product unit or a food-product subunit from a storage location, such as an electronic ledger (e.g., ledger 145, FIG. 1). In some embodiments, such information can aid in verifying the safety and/or authenticity of a food-product unit or subunit. Additionally, in some embodiments, such information can allow traceability of a food product from a producer to an end consumer.

Figure 4:
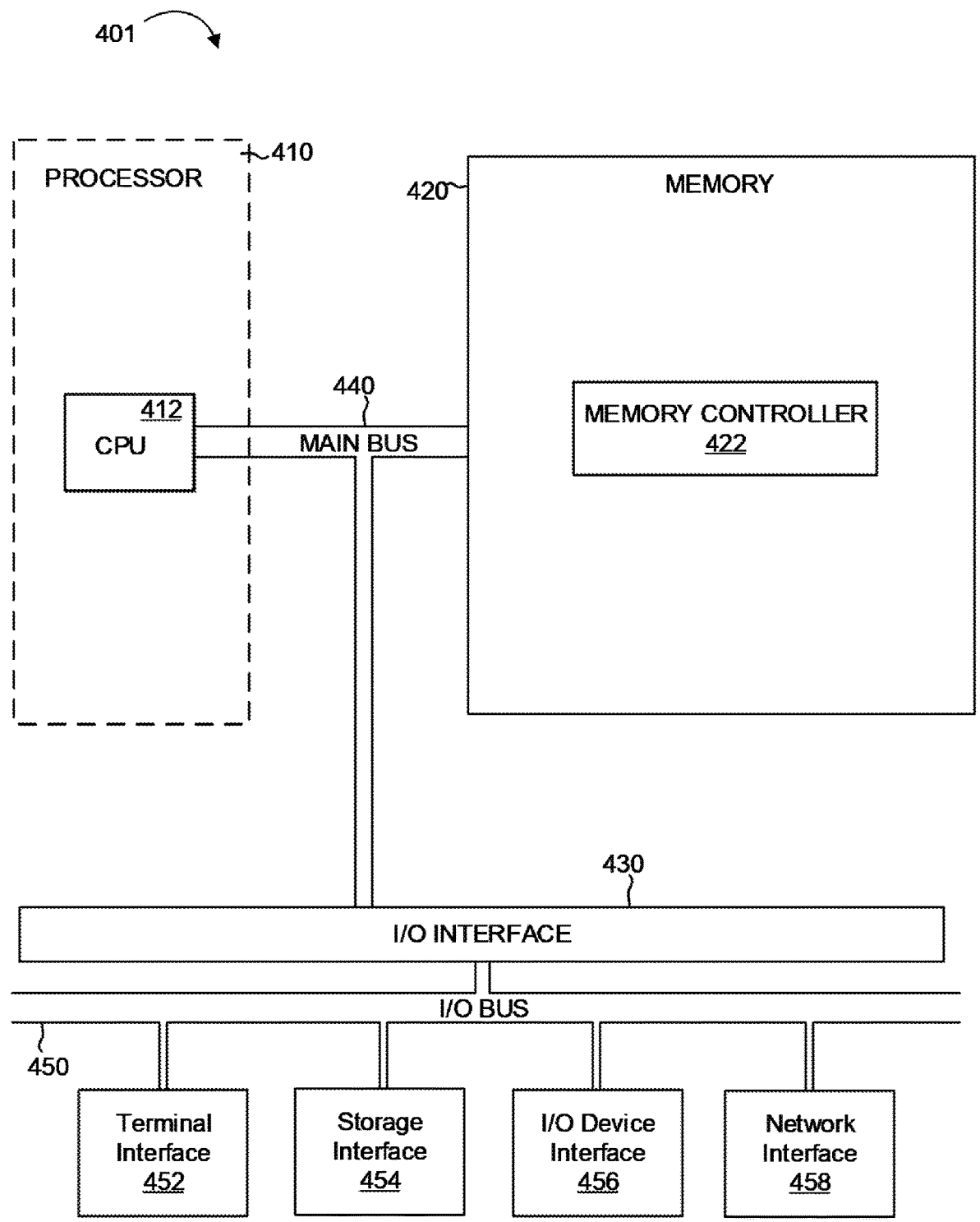
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
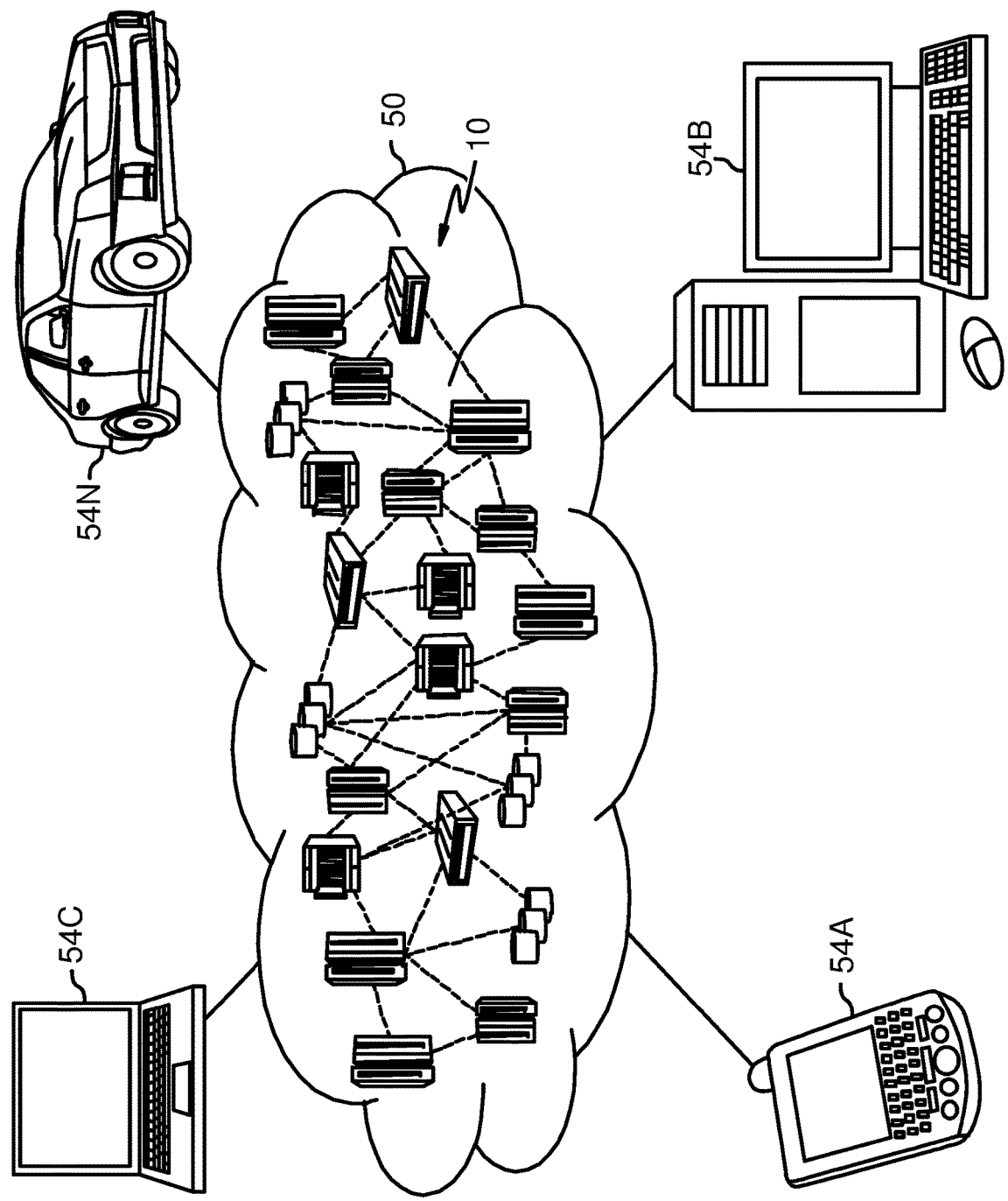
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
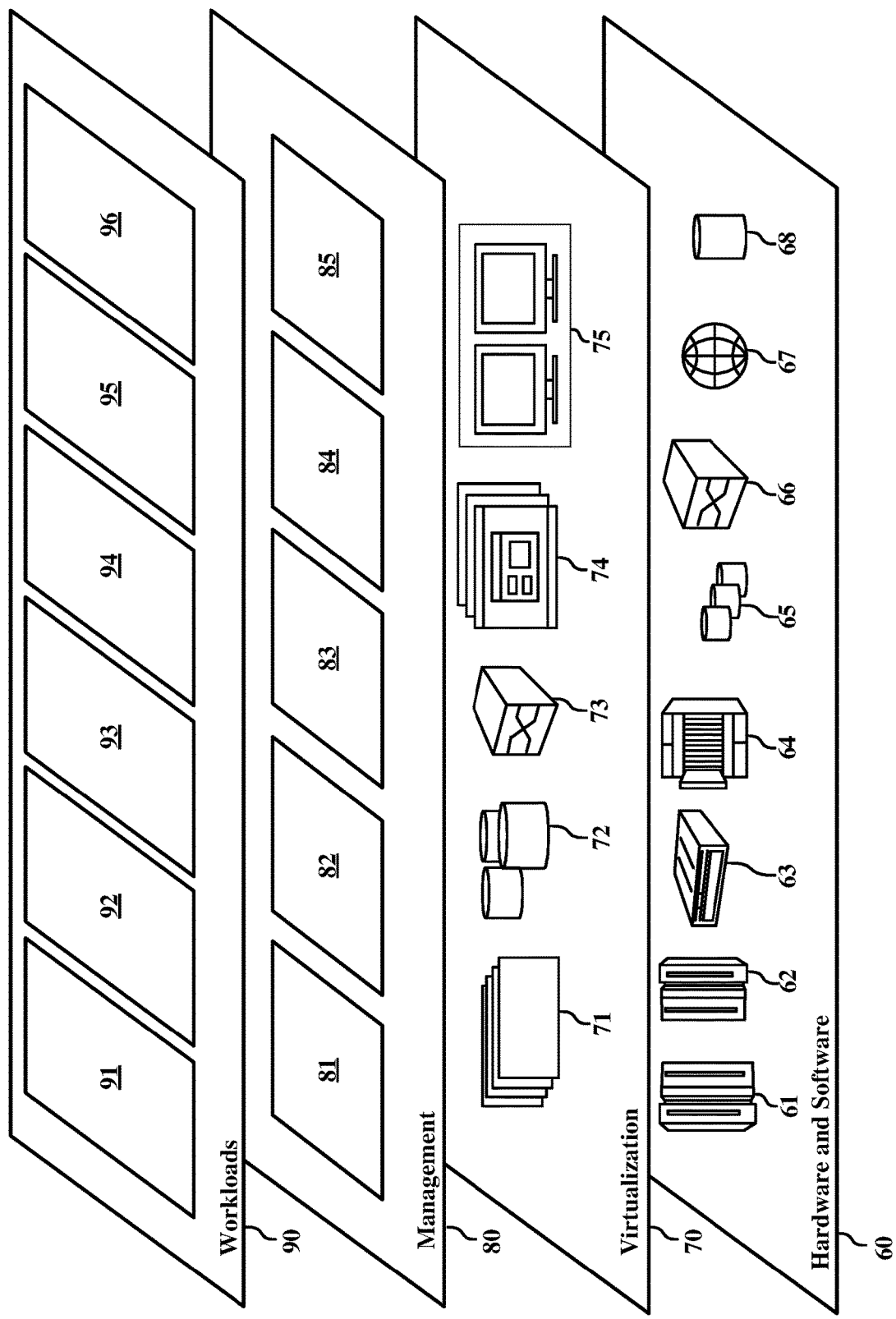
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and tracking system logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes determining by photogrammetry, a first volume of a food-product unit and a second volume of a food-product subunit, the food-product subunit being a separated portion of the food-product unit; generating a code for the food-product subunit, the code comprising a first identifier for the food-product unit and a second identifier for the food-product subunit, wherein the first identifier is based, at least in part, on the first volume, wherein the second identifier is based, at least in part, on the second volume; and assigning the code to the food-product subunit.

Example 2 includes the method of example 1, including or excluding optional features. In this example, the determining by photogrammetry comprises obtaining a set of images of the food-product unit; identifying, based on the set of images, one or more first borders of the food-product unit; and calculating, based at least in part on the one or more first borders, the first volume of the food-product unit.

Example 3 includes the method of any one of examples 1 to 2, including or excluding optional features. In this example, the determining by photogrammetry comprises obtaining a set of images of the food-product subunit; identifying, based on the set of images, one or more second borders of the food-product subunit; and calculating, based at least in part on the one or more second borders, the second volume of the food-product subunit.

Example 4 includes the method of any one of examples 1 to 3, including or excluding optional features. In this example, the determining by photogrammetry comprises obtaining a set of images of the food-product unit; identifying, based on the set of images, one or more first borders of the food-product unit, the one or more first borders including two or more points; and identifying, based on a changed distance between the two or more points, the food-product subunit.

Example 5 includes the method of any one of examples 1 to 4, including or excluding optional features. In this example, the method includes obtaining a set of characteristics of the food-product subunit, wherein the code further comprises a third identifier for the set of characteristics.

Example 6 includes the method of any one of examples 1 to 5, including or excluding optional features. In this example, the set of characteristics is selected from the group consisting of weight, color, texture, time, and location.

Example 7 includes the method of any one of examples 1 to 6, including or excluding optional features. In this example, generating the code comprises generating a hash.

Example 8 includes the method of any one of examples 1 to 7, including or excluding optional features. In this example, the determining by photogrammetry comprises obtaining a first image of the food-product unit from a first capture orientation; and obtaining a second image of the food-product unit from a second capture orientation, the first capture orientation being different from the second capture orientation.

What is claimed is:

1. A computer-implemented method comprising:
tracking by photogrammetry, a food-product unit during a food-processing operation to identify one or more first borders of the food-product unit, the one or more first borders including two or more points, and identify, based on a changed distance between the two or more points of the one or more first borders that exceeds a threshold distance, separation of a food-product subunit from the food-product unit;
determining by the photogrammetry, a first volume of the food-product unit and a second volume of the food-product subunit;
generating a code for the food-product subunit, the code comprising a first identifier for the food-product unit and a second identifier for the food-product subunit,
wherein the first identifier is based, at least in part, on the first volume,
wherein the second identifier is based, at least in part, on the second volume; and
assigning the code to the food-product subunit.

2. The computer-implemented method of claim 1, wherein the determining by the photogrammetry further comprises:
obtaining a set of images of the food-product unit;
identifying, based on the set of images, the one or more first borders of the food-product unit; and
calculating, based at least in part on the one or more first borders, the first volume of the food-product unit.

3. The computer-implemented method of claim 1, wherein the determining by the photogrammetry further comprises:
obtaining a set of images of the food-product subunit;
identifying, based on the set of images, one or more second borders of the food-product subunit; and
calculating, based at least in part on the one or more second borders, the second volume of the food-product subunit.

4. The computer-implemented method of claim 1, further comprising:
obtaining a set of characteristics of the food-product subunit, wherein the code further comprises a third identifier for the set of characteristics.

5. The computer-implemented method of claim 4, wherein the set of characteristics is selected from the group consisting of weight, color, texture, time, and location.

6. The computer-implemented method of claim 1, wherein generating the code comprises generating a hash.

7. The computer-implemented method of claim 1, wherein the determining by the photogrammetry further comprises:
obtaining a first image of the food-product unit from a first capture orientation; and
obtaining a second image of the food-product unit from a second capture orientation, the first capture orientation being different from the second capture orientation.

8. A system comprising:
a processor; and
a memory in communication with the processor, the memory containing program instructions that, when executed by the processor, are configured to cause the processor to:
track by photogrammetry, a food-product unit during a food-processing operation to identify one or more first borders of the food-product unit, the one or more first borders including two or more points, and identify, based on a changed distance between the two or more points of the one or more first borders that exceeds a threshold distance, separation of a food-product subunit from the food-product unit;
determine by the photogrammetry, a first volume of the food-product unit and a second volume of the food-product subunit;
generate a code for the food-product subunit, the code comprising a first identifier for the food-product unit and a second identifier for the food-product subunit,
wherein the first identifier is based, at least in part, on the first volume,
wherein the second identifier is based, at least in part, on the second volume; and
assign the code to the food-product subunit.

9. The system of claim 8, wherein the program instructions configured to cause the processor to determine by the photogrammetry the first volume of the food-product unit are further configured to cause the processor to:
obtain a set of images of the food-product unit;
identify, based on the set of images, the one or more first borders of the food-product unit; and
calculate, based at least in part on the one or more first borders, the first volume of the food-product unit.

10. The system of claim 8, wherein the program instructions configured to cause the processor to determine by the photogrammetry the second volume of the food-product subunit are further configured to cause the processor to:
obtain a set of images of the food-product subunit;
identify, based on the set of images, one or more second borders of the food-product subunit; and
calculate, based at least in part on the one or more second borders, the second volume of the food-product subunit.

11. The system of claim 8, wherein the program instructions are further configured to cause the processor to:
obtain a set of characteristics of the food-product subunit, wherein the code further comprises a third identifier for the set of characteristics.

12. The system of claim 8, wherein the program instructions configured to cause the processor to track by the photogrammetry the food-product unit are further configured to cause the processor to:

obtain a first image of the food-product unit from a first capture orientation; and obtain a second image of the food-product unit from a second capture orientation, the first capture orientation being different from the second capture orientation.

13. A computer program product comprising a computer readable storage medium having program instructions embodied therewith, the program instructions executable by a processor to cause the processor to:

track by photogrammetry, a food-product unit during a food-processing operation to identify one or more first borders of the food-product unit, the one or more first borders including two or more points, and identify, based on a changed distance between the two or more points of the one or more first borders that exceeds a threshold distance, separation of a food-product subunit from the food-product unit;

determine by the photogrammetry, a first volume of the food-product unit and a second volume of the food-product subunit, the food-product subunit being a separated portion of the food-product unit;

generate a code for the food-product subunit, the code comprising a first identifier for the food-product unit and a second identifier for the food-product subunit, wherein the first identifier is based, at least in part, on the first volume, wherein the second identifier is based, at least in part, on the second volume; and assign the code to the food-product subunit.

14. The computer program product of claim 13, wherein the program instructions executable to cause the processor to determine by the photogrammetry the first volume of the food-product unit are further executable to cause the processor to:

obtain a set of images of the food-product unit;

identify, based on the set of images, one or more the first borders of the food-product unit; and calculate, based at least in part on the one or more first borders, the first volume of the food-product unit.

15. The computer program product of claim 13, wherein the program instructions executable to cause the processor to determine by the photogrammetry the second volume of the food-product subunit are further executable to cause the processor to:

obtain a set of images of the food-product subunit;

identify, based on the set of images, one or more second borders of the food-product subunit; and calculate, based at least in part on the one or more second borders, the second volume of the food-product subunit.

16. The computer program product of claim 13, wherein the program instructions are further executable to cause the processor to:

obtain a set of characteristics of the food-product subunit, wherein the code further comprises a third identifier for the set of characteristics.

17. The computer program product of claim 13, wherein the program instructions executable to cause the processor to track by the photogrammetry the food-product unit are further executable to cause the processor to:

obtain a first image of the food-product unit from a first capture orientation; and obtain a second image of the food-product unit from a second capture orientation, the first capture orientation being different from the second capture orientation.

* * * * *